United States Patent
Firth et al.

[15] 3,702,397
[45] Nov. 7, 1972

[54] INFRA-RED GAS DETECTORS

[72] Inventors: Jack Graham Firth, Chapeltown; Thomas Alwyn Jones, Dronfield, both of England

[73] Assignee: National Research Development Corporation, London, England

[22] Filed: Feb. 16, 1971

[21] Appl. No.: 115,677

[52] U.S. Cl. .................................. 250/43.5 R, 250/85
[51] Int. Cl. .............................................. G01n 21/26
[58] Field of Search ............. 219/553; 250/43.5 R, 85

[56] References Cited

UNITED STATES PATENTS

| | | | |
|---|---|---|---|
| 2,806,144 | 9/1957 | Berger et al. | 250/43.5 R |
| 3,005,097 | 10/1961 | Hummel | 250/43.5 R |
| 3,227,873 | 1/1966 | Liston | 250/43.5 R |
| 3,462,596 | 8/1969 | Saunders | 250/43.5 R |
| 3,536,919 | 10/1970 | Newman | 250/85 |

FOREIGN PATENTS OR APPLICATIONS

| | | | |
|---|---|---|---|
| 694,777 | 7/1953 | Great Britain | 250/43.5 R |

*Primary Examiner*—John K. Corbin
*Attorney*—Cushman, Darby & Cushman

[57] ABSTRACT

Means for detecting a component of an atmosphere comprises a source of radiation and a detector arranged so as to receive and be responsive to radiation through said atmosphere from the source, the intensity of the radiation from the source increasing rapidly with respect to wavelength just below the peak of an absorption band of the chosen component, and the response of the detector decreasing rapidly with respect to wavelength just above the peak of the absorption band. Selection of source, detector and radiation filters allows detection of one component, such as methane or carbon monoxide, without falsification of the result by another component such as carbon dioxide.

15 Claims, 5 Drawing Figures

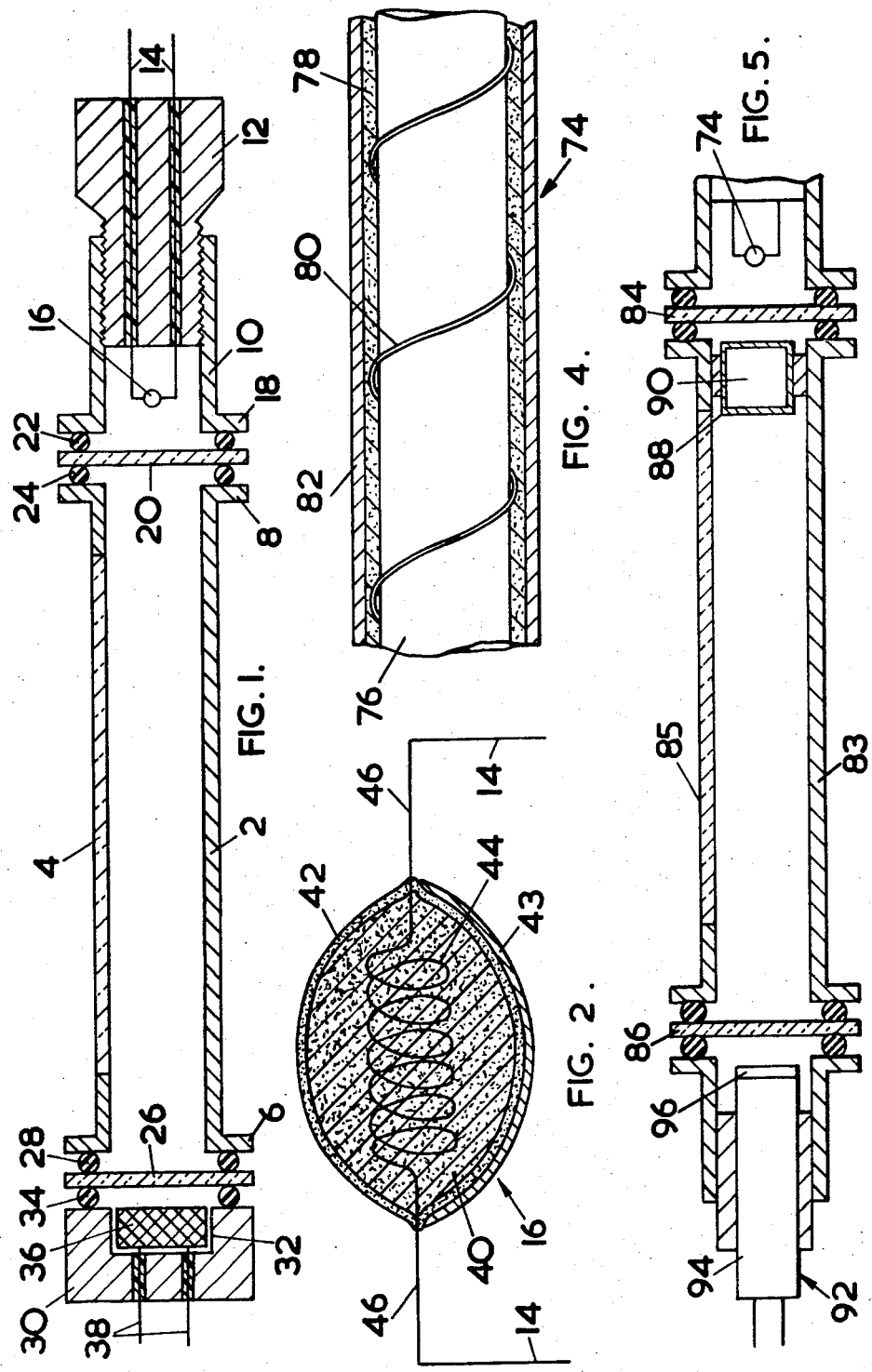

INFRA-RED GAS DETECTORS

The invention relates to gas detectors.

It is well known to detect the presence and concentration of a gas in an atmosphere by means of utilizing the absorption by the gas of characteristic portions of the electromagnetic spectrum, for example, in the infra-red region but hitherto the methods by which this has been done have relied substantially entirely on filtering techniques or somewhat complex optical systems in order to define the band of wavelengths to which the instrument is sensitive and to make the instruments non-ambiguous. The method according to the invention enables the presence of one predecided gas to be detected by a simpler system and in consequence apparatus can be provided in a simple robust form suitable for use under arduous conditions such as in a coal mine.

According to the invention, apparatus for measuring the concentration of a component of an atmosphere, said component having at least one absorption band in the e.m.r. spectrum, which comprises an enclosure into which the atmosphere under test can pass, a source of electromagnetic radiation the intensity of which increases rapidly with respect to increasing wavelength just below the peak of said absorption band, a detecting system having a response to radiation which decreases rapidly with respect to increasing wavelength just above the peak of said absorption band, said detecting system including a detector for detecting radiation which has passed from the source through the enclosure, and means for indicating the output of the detector.

If the atmosphere may contain an impurity which absorbs radiation at a wavelength close to or within the radiation band between the wavelength at which the intensity of emitted radiation increases rapidly and the wavelength at which the sensitivity of the detector decreases rapidly, means may be optionally provided in the radiation path between the source and the detector to absorb radiation at the absorption wavelength of the impurity. Such means may comprise a second enclosure containing a high concentration of the impurity. Alternatively such means may be a "window" of material absorbent to the appropriate wavelength and transparent to other wavelengths The source and detector may be situated one at each end of a tube and may be isolated from the atmosphere inside the tube by windows transparent to e.m.r. at least in the vicinity of the wavelength of the absorption band. Optionally such windows can be arranged so as to be absorbent to radiation at the absorption wavelength of an atmospheric impurity. Alternatively such windows may be used as part of the detecting system to define the wavelength at which the response of the detecting system decreases rapidly.

The internal wall of the tube should preferably be reflecting to e.m.r. at the wavelength of the absorption band; part at least of the wall should be porous so that the atmosphere under test can communicate with an ambient atmosphere through the porous part which also prevents entry into the tube of particles or droplets of material which would scatter the radiation in the tube; different filtering materials may be used for specific applications.

For example, the source may be arranged to emit radiation in the infra-red region of the spectrum such that the intensity of radiation emitted increases rapidly with respect to wavelength in the neighborhood of a wavelength of 3 $\mu$m and the detector may be sensitive to radiation in the infra-red region of the spectrum and be arranged so that its response to radiation decreases rapidly with respect to wavelength at wavelengths greater than 3.5 $\mu$m, said combination of source and detector being capable of responding to radiation in the band from 3.0 to 3.5 $\mu$m. The C—H band in a hydrocarbon absorbs infra-red radiation in this band so that said combination of emitter and detector is suitable for detecting a hydrocarbon. For example methane gas absorbs infra-red radiation in a narrow band centered on 3.4 $\mu$m so that the presence of methane in the atmosphere under test can be detected and measured.

A suitable source is a glass, preferably a borosilicate glass, for example, of the composition $SiO_2$, 75.7%; $Al_2O_3$, 5.5%; $B_2O_3$, 12%; $CaO$, 0.9%; $BaO$, 2%; $K_2O$, 3.9%; the glass may be arranged as a coating on a ceramic bead heated internally by a platinum wire through which electricity may be passed until the glass coating has been heated to a temperature of 500° to 700°C at which temperature the said glass emits infra-red radiation which increases rapidly in intensity at a wavelength of about 3 $\mu$m. A suitable detector is an indium arsenide semi-conductor photovoltaic cell.

In order to increase the intensity of radiation incident on the detector, the side of the source remote from the detector may be coated with a coating reflective to the emitted radiation. For example, after the glass coating has been applied to the ceramic bead, the bead may be partially immersed in a suspension of finely divided metal such as platinum in a commercial organic solvent and the bead may be heated to drive off the solvent leaving a coating of the metal which reflects emitted radiation towards the detector. If any water vapor were present in the atmosphere under test, the absorption band of water centered at about 2.8 $\mu$m would interfere with the response of the detector since the increase in intensity of the radiation emitted by the source is not perfectly sharp. The windows provided in the tube to separate the source and detector from the atmosphere under test may conveniently be formed from silica or alternatively separate silica windows may be placed in the tube; silica contains adsorbed water molecules which absorb radiation in a band centered at 2.8 $\mu$m and therefore the windows reduce to negligible proportions the radiation at wavelengths around 2.8 $\mu$m transmitted to the atmosphere under test and received by the detector. However, the silica windows are transparent to radiation between 3.0 and 3.5 $\mu$m. Preferably the silica is spectrocell silica.

The output of the detector may be amplified for example by an electronic amplifier, and displayed suitably on means such as a microammeter. For increased accuracy in detecting small concentrations of gases a second system similar to that described here utilizing the same source, or alternatively a second source, but not open to the ambient atmosphere may be used to compensate for small variations in the intensity of radiation due to fluctuations in the temperature of the source.

In another example, a detecting system suitable for the detection of carbon monoxide in concentrations between 1 and 10 percent comprises a source consisting of a rod of silica covered with a layer of alumina in which is embedded a platinum wire forming a heating coil and covered with an outer layer of silica. The source is prepared by winding the platinum wire round a silica rod or tube, inserting the wire and rod or tube into a silica tube, filling the space around the wire with aluminium nitrate and heating the tube to decompose the aluminium nitrate leaving alumina which acts to hold the silica rod and the platinum wire in position in the silica tube. On heating the silica by means of passing a current through the heating coil, radiation is emitted the intensity of which increases rapidly with respect to wavelength in the neighborhood of a wavelength of 4 $\mu$m. Carbon monoxide gas absorbs infra-red radiation in a narrow band with two peaks at 4.6 $\mu$m and 4.7 $\mu$m. If the source is situated in a tube which has windows of calcium fluoride which strongly absorbs radiation at wavelengths between 5 $\mu$m and 8 $\mu$m, then radiation passing from the source through the sample gas will be at wavelengths between 4 $\mu$m and 5 $\mu$m and above 8 $\mu$m. The detector may be an indium antimonide photo-conductive cell which has maximum sensitivity at a wavelength of 6 um but has high sensitivity at 4.7 $\mu$m and a response which decreases rapidly in the region of 7 $\mu$m. Alternatively the detector may be a thermocouple type detector with a sapphire window; sapphire absorbs radiation at wavelengths greater than about 7 $\mu$m. In order to filter out radiation at 4.4 $\mu$m which is the absorption frequency of carbon dioxide, a cell containing a suitable concentration of carbon dioxide is placed in the radiation path. For example the cell may be 1 inch in length and contain 10 percent carbondioxide in air, or may be one-tenth inch in length and contain 100 percent carbon dioxide. This prevents false readings being obtained if carbon dioxide is present in the sample gas.

In another example, by using the source, detecting system, and windows described for the detection of carbon monoxide, but by placing a cell containing a high concentration of carbon monoxide in the radiation path instead of the cell containing carbon dioxide, the system could be used for the detection of carbon dioxide.

One embodiment of the invention will now be described by way of example only and with reference to FIGS. 1, 2 and 3 of the drawing accompanying the provisional specification and to FIGS. 4 and 5 of the accompanying drawing in which:

FIG. 1 illustrates diagrammatically a suitable assembly

FIG. 2 illustrates diagrammatically the construction of the emitter

FIG. 4 illustrates diagrammatically a modified assembly and

FIG. 5 illustrates diagrammatically an alternative form of emitter.

Figure 3:
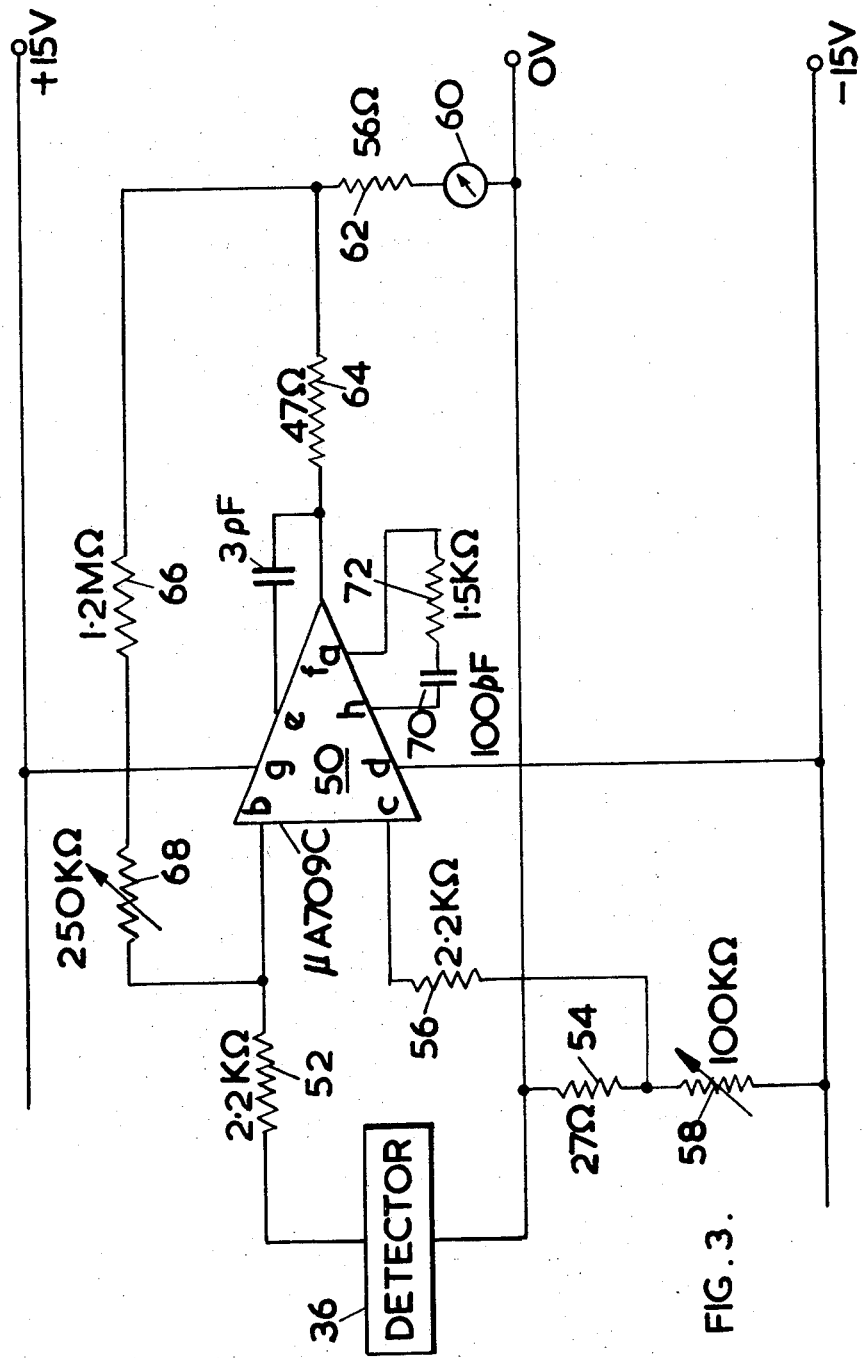
FIG. 3 illustrates a suitable electric circuit for amplification and display of detector output.

Referring to FIG. 1, a brass tube 2, whose internal surface is reflective and part of the wall of which 4 is of porous sintered metal, has at one end a flange 6 and at the opposite end a flange 8. A tube 10 of substantially the same diameter as tube 2 is provided with plug 12 which screws into tube 10. Two electrical connecting wires 14 pass through and are insulated from plug 12 and carry between them an emitter of infra-red radiation 16. At the opposite end of tube 10 from plug 12, the tube 10 is provided with a flange 18. A silica window 20 is arranged to completely cover the end of tube 10 and is separated from flange 18 by O-ring 22. Tube 2 is arranged so that flange 8 is adjacent to silica window 20 and is separated therefrom by O-ring 24. Flanges 8 and 18 are clamped together by means not shown. At the opposite end of tube 2 from silica window 20 is a silica window 26 which completely covers the end of tube 2 and is separated from flange 6 by O-ring 28. A closure 30, part of which has been machined away to form a cavity 32 is arranged in abutment with silica window 26 and is separated therefrom by O-ring 34. The cavity 32 is adjacent to silica window 26 and an indium arsenide semi-conductor photovoltaic cell 36 is located in cavity 32 between closure 30 and silica window 26. Electrical connecting wires 38 pass through and are insulated from closure 30 and are connected to cell 36. Closure 30 is clamped to flange 6 by means not shown.

FIG. 2 illustrates diagrammatically a source of infra-red radiation 16 comprising a ceramic bead 40 the surface of which is covered by a layer 42 of borosilicate glass and in which is embedded a platinum wire heating coil 44 the end portions of which 46 protrude through the ceramic bead 40 and layer of glass 42 and are connected with wires 14.

The surface of the glass 42 covering the ceramic bead 40 is covered on the side which is to be furthest from the detector (ie cell 36) by a layer of platinum 43.

In operation, the ambient gas, which usually will be air containing a proportion of some poisonous or flammable gas, diffuses through the sintered metal portion 4 into tube 2. An electric current is passed along wires 14 and through the heater wire 44 causing wire 44 to increase in temperature. Bead 40 and layer of borosilicate glass 42 are thereby heated up to a suitable temperature in the range 500° to 700°C and the borosilicate glass layer 42 emits infra-red radiation in a range whose lower limit of wavelength is at about 3 $\mu$m. The radiation passes through silica window 20 which substantially cuts out any infra-red radiation in a band centered at 2.8 $\mu$m which covers most of the interfering part of the absorption band for atmospheric water vapor and then passes along tube 2, through the gas contained therein, through silica window 26 which substantially cuts out any remaining infra-red radiation in a band centered at 2.8 $\mu$m and falls on detector 36 which responds to radiation at wavelengths shorter than about 3.6 $\mu$m by producing an electric current which passes by means of wires 38 to an electronic circuit in which it may be amplified and displayed by suitable means.

If a gas is present in tube 2 which absorbs radiation in a range between about 2.9 to 3.5 $\mu$m, such as methane which absorbs at 3.4 $\mu$m, the response produced by the detector will be less than it would otherwise be. The instrument may therefore be calibrated by introducing in turn atmospheres containing known quantities of methane, recording the corresponding output of the detector and plotting a curve of detector output against methane concentration. The instrument may then be used in an atmosphere of unknown methane concentration and when a value of detector output has been obtained, the methane concentration may be read from the calibration curve.

In FIG. 3 reference numeral 50 indicates a high gain DC-amplifier which for example may suitably be an integrated circuit known as uA 709C such that the difference between signals applied to pins 50b and 50c is amplified.

A potential of +15v d.c. is applied to pin 50g and a potential of −15v d.c. is applied to pin 50d. The output signal from detector 36 is applied to pin 50b through a resistor 52 of value 2.2 kΩ and the other side of detector 36 is connected to earth. A variable potential is applied to pin 50c by means of resistors 54 (27 kΩ) and 56 (2.2 kΩ) and variable resistor 58 of maximum value 100 kΩ. The output of amplifier 50 from pin 50f is applied to one side of a 100 uA f.s.d. meter 60 through a resistor 64 (47Ω) and a fixed resistor 62 of value 56Ω. The other side of meter 60 is earthed. A feedback loop comprises a resistor 66 (1.2 MΩ) and a variable resistor 68 of maximum value 250 kΩ connected between pin 50b and a point between resistors 62 and 64. The gain of the system is governed by the relative values of resistive loads in the feedback loop and the input line, ie 66 + 68 : 56 ([1.2 MΩ + 250 kΩ] : 2.2 kΩ). The capacitor 70 and resistor 72 connected between terminals 50a and 50h of the amplifier 50 prevent build-up of oscillations in the amplifier.

In operation, with no methane present in the test enclosure, the voltage applied to pin 3c is adjusted by means of adjusting variable resistor 58 until the signals applied to pins 50b and 50c are equal, and the amplifier output is zero.

An atmosphere containing methane is introduced into the test enclosure and the methane absorbs some of the radiation emitted from emitter 16, the output signal of detector 36 is reduced and the signal applied to pin 50b is reduced. There is now a difference between the signals applied to pins 50b and 50c and this difference is amplified and is indicated on meter 60. By previous calibration of the apparatus the reading may be converted to percentage of methane in the atmosphere in the test enclosure.

In FIG. 4 a silica source 74 is shown in section; it comprises a rod of silica 76 covered with a layer of alumina 78 in which is embedded a coil of platinum wire 80, suitably of 0.002 inch thickness. The layer of alumina and the wire are covered with a tube of silica 82. In operation, an electric current is passed through the wire 80 which causes the wire 80 to increase in temperature, thus heating the alumina layer 78 and the silica rod 76 and silica layer 82. The silica layer 82 emits infra red radiation at wavelengths greater than 4 μm.

In FIG. 5 is shown a suitable assembly similar to that shown in FIG. 1, differing in that the source 74 is a silica source such as that described with reference to FIG. 4, the windows 84, 86 are made of calcium difluoride, a cell 88 containing a high concentration of carbon dioxide 90 is situated in the tube 83 between the source 74 and the detecting system 92 which comprises a thermocouple type detector 94, such as a Hilger-Schwartz thermocouple type detector with a sapphire window 96. In operation the assembly is exposed to a gas which enters the tube 83, through porous part 85, the source 74 emits radiation at wavelengths greater than 4μm which passes through the window 84 which absorbs a substantial part of radiation between 5 μm and 8 μm. The radiation then passes through the cell 88 in which the carbon dioxide 90 absorbs radiation at a wavelength of 4.4 μm, passes through the gas in 83, through the window 86 which substantially absorbs any radiation between 5 μm and 8 μm and passes through the sapphire window 86 which absorbs radiation at wavelengths greater than 7 μm, to the thermocouple detector 94. The detector 94 will therefore not detect any radiation at 4.4 μm. The range detected includes the peak absorption wavelengths of carbon monoxide at 4.6 μm and 4.7 μm. If the gas in the tube 83 contains carbon dioxide in addition to carbon monoxide, a false reading is not give since radiation at the carbon dioxide absorption wavelength of 4.4 μm does not fall on the detector 92, having been already absorbed by the carbon dioxide in cell 88.

The invention has been particularly described with reference to the detection of methane in air, when it has particular importance for monitoring the atmosphere in coalmines and to the detection of carbon monoxide and carbon dioxide. However the invention is not restricted to the detection of these gases; other gases and vapors can be detected by suitable choice of emitter and detector characteristics in relation to a strong absorption band of a gas it is desired to detect, in similar manner to that which has been described and the source and emitter used to detect methane can detect any hydrocarbon. Usually the most favorable absorption bands will be situated in the infra red part of the spectrum, but in some instances it may be found desirable to operate in the visible or ultra violet parts of the spectrum. In addition, the invention may be used to detect the presence of a chosen liquid in a liquid mixture.

A further application of the invention is for the measurement of concentration of carbon monoxide in the exhaust gases from internal combustion engines.

We claim:

1. Apparatus for measuring the concentration of a constituent of an atmosphere, said constituent having an absorption band in the electromagnetic radiation spectrum, which comprises an enclosure into which the atmosphere under test can pass, a source of electromagnetic radiation the intensity of which increases rapidly with respect to increasing wavelength just below the peak of the said absorption band, a detecting system having a response to radiation which decreases rapidly with respect to increasing wavelength just above the peak of the said absorption band, said detecting system including a detector for detecting radiation which has passed from the source through the enclosure, and means for indicating the output of the detector.

2. Apparatus according to claim 1 suitable for the detection of a hydrocarbon in which the source of electromagnetic radiation includes a heatable body of glass and the detecting system comprises an indium arsenide photovoltaic cell.

3. Apparatus according to claim 2 in which the body of glass is arranged as a coating on a ceramic bead heated internally by a platinum wire through which an electric current may be passed so as to heat the glass coating to a temperature in the range 500° to 700°C.

4. Apparatus according to claim 3 in which the side of the glass coated ceramic bead remote from the detector is coated with platinum so that when said bead is heated, radiation is reflected from the platinum coating towards the detector.

5. Apparatus according to claim 1 and having in the radiation path between the source of electromagnetic radiation and the detector, radiation absorption means which can absorb radiation at the absorption wavelength of a possible impurity in the atmosphere said impurity having an absorption wavelength close to or within the band of wavelengths between the wavelength at which the intensity of radiation emitted by the source increases rapidly with respect to increasing wavelength and the wavelength at which the response of the detector decreases rapidly with respect to increasing wavelength.

6. Apparatus according to claim 5 suitable for the detection of a hydrocarbon in which the source of electromagnetic radiation includes a heatable body of glass, the detecting system comprises an indium arsenide photovoltaic cell and having in the radiation path between said source and the detector at least one silica window.

7. Apparatus according to claim 5 in which the said radiation absorption means comprises a second enclosure containing a sufficient quantity of the possible impurity to absorb substantially all of the incident radiation at the absorption wavelength of the impurity.

8. Apparatus according to claim 7, suitable for the detection of carbon monoxide gas, in which the source of electromagnetic radiation includes a heatable body of silica and the detector comprises an indium antimonide photoconductive cell, and having in the radiation path between said source and detector at least one calcium difluoride window and a second enclosure containing carbon dioxide.

9. Apparatus according to claim 7, suitable for the detection of carbon dioxide gas in which the source of electromagnetic radiation includes a heatable body of silica and the detector comprises an indium antimonide photoconductive cell, and having in the radiation path between said source and detector at least one calcium difluoride window and a second enclosure containing carbon monoxide.

10. Apparatus according to claim 8 in which the heatable body comprises an outer silica tube, an inner silica element having a cylindrical outer surface a platinum wire would round the inner silica element, and an alumina filling, occupying the space between the inner element and the outer tube.

11. Apparatus according to claim 9 in which the heatable body comprises an outer silica tube, an inner silica element having a cylindrical outer surface a platinum wire would round the inner silica element and an alumina filling occupying the space between the inner element and the outer tube.

12. Apparatus according to claim 7, suitable for the detection of carbon monoxide gas, in which the source of electromagnetic radiation includes a heatable body of silica and the detector comprises a thermocouple, and having in the radiation path between said source and detector at least one calcium difluoride window, a second enclosure containing carbon dioxide and nearest to the detector a sapphire window.

13. Apparatus according to claim 7, suitable for the detection of carbon dioxide gas, in which the source of electromagnetic radiation includes a heatable body of silica and the detector comprises a thermocouple, and having in the radiation path between said source and detector at least one calcium difluoride window, a second enclosure containing carbon monoxide, and nearest to the detector a sapphire window.

14. Apparatus according to claim 1 in which the wall of the enclosure comprises a porous part through which the atmosphere under test can pass into said enclosure.

15. Apparatus according to claim 1 in which the inner wall of the enclosure is reflective to electromagnetic radiation at least of the wavelengths emitted by the source.

* * * * *

UNITED STATES PATENT OFFICE
CERTIFICATE OF CORRECTION

Patent No. 3,702,397        Dated November 7, 1972

Inventor(s) Jack Graham Firth and Thomas Alwyn Jones

It is certified that error appears in the above-identified patent and that said Letters Patent are hereby corrected as shown below:

In the heading, please add:

[30]   Foreign Application Priority Data

February 17, 1970    Great Britain.........7521/70

Signed and sealed this 29th day of May 1973.

(SEAL)
Attest:

EDWARD M. FLETCHER, JR.                ROBERT GOTTSCHALK
Attesting Officer                       Commissioner of Patents